(12) United States Patent
Hymel

(10) Patent No.: US 8,850,492 B2
(45) Date of Patent: Sep. 30, 2014

(54) METHOD, SYSTEM AND APPARATUS FOR DELIVERING DATA TO A MOBILE ELECTRONIC DEVICE

(75) Inventor: James Allen Hymel, Kitchener (CA)

(73) Assignee: BlackBerry Limited, Waterloo (CA)

( * ) Notice: Subject to any disclaimer, the term of this patent is extended or adjusted under 35 U.S.C. 154(b) by 50 days.

(21) Appl. No.: 13/183,799

(22) Filed: Jul. 15, 2011

(65) Prior Publication Data

US 2013/0019269 A1    Jan. 17, 2013

(51) Int. Cl.
*H04N 7/20* (2006.01)
*G06F 15/16* (2006.01)
*H04N 21/41* (2011.01)
*H04N 21/4722* (2011.01)
*H04N 21/4363* (2011.01)

(52) U.S. Cl.
CPC ....... *H04N 21/4126* (2013.01); *H04N 21/4722* (2013.01); *H04N 21/43637* (2013.01)
USPC ................. 725/62; 725/70; 725/71; 709/203

(58) Field of Classification Search
USPC ............... 725/131, 37; 709/203; 707/999.104
See application file for complete search history.

(56) References Cited

U.S. PATENT DOCUMENTS

| | | | |
|---|---|---|---|
| 7,721,337 B2 | 5/2010 | Syed | |
| 8,316,401 B2 * | 11/2012 | Kim et al. | 725/70 |
| 8,549,566 B2 * | 10/2013 | Suh et al. | 725/71 |
| 2005/0193408 A1 | 9/2005 | Sull et al. | |
| 2009/0150487 A1 * | 6/2009 | Wolfish et al. | 709/203 |
| 2010/0186059 A1 | 7/2010 | Suh et al. | |
| 2010/0281108 A1 | 11/2010 | Cohen | |
| 2010/0309387 A1 | 12/2010 | Eyer | |
| 2010/0313235 A1 * | 12/2010 | Straub | 725/131 |
| 2011/0202955 A1 * | 8/2011 | Marler et al. | 725/37 |

OTHER PUBLICATIONS

Extended European Search report mailed Dec. 19, 2011; in corresponding application No. 11174251.6.
Eyer m. Non-Real-time services for terrestrial broadcast digital television, Consumer electronics (ICCE), 2010 Digest of technical papers international conference on, IEEE, Piscataway, NJ, USA, Jan. 9, 2010. pp. 351-352, XP031640934, ISBN:978-1-4244-4314-7.
MediaFLO—http://en.wikipedia.org/wiki/MediaFLO downloaded from the Internet on Sep. 26, 2011.

(Continued)

*Primary Examiner* — Mulugeta Mengesha
*Assistant Examiner* — Tariq Gbond
(74) *Attorney, Agent, or Firm* — Novak Druce Connolly Bove + Quigg LLP

(57) ABSTRACT

According to embodiments described in the specification, a method, system and apparatus for delivering Non-Real-Time (NRT) data to a mobile electronic device are provided. The method comprises: storing the NRT data in a memory of a server, the NRT data comprising a multimedia file; storing at least one network identifier in the memory, the at least one network identifier identifying at least a portion of the multimedia file and a storage location of the multimedia file; formatting the NRT data using a processor of the server, wherein the formatting comprises generating header data including the at least one network identifier, and appending the multimedia file to the header data; and providing the formatted NRT data to broadcast equipment for broadcasting.

14 Claims, 11 Drawing Sheets

(56) References Cited

OTHER PUBLICATIONS

Roundbox Mobile DTV Widgets http://broadcastengineering.com/products/roundbox-mobile-dtv-widgets-marry-mobile-web-0505/, downloaded from the Internet on Sep. 26, 2011.

Nokia IP Datacasting Technology http://www.nokia.com/NOKIA_COM_1/About_Nokia/Sidebar_Teasers/Whitepapers/ipdatacastingtechnology2.pdf Downloaded from the Internet on Sep. 26, 2011.

* cited by examiner

METHOD, SYSTEM AND APPARATUS FOR DELIVERING DATA TO A MOBILE ELECTRONIC DEVICE

FIELD

The specification relates generally to the delivery of data, and specifically to a method, system and apparatus for delivering data to a mobile electronic device.

BACKGROUND

Mobile electronic devices are increasingly capable of receiving broadcast data, such as television streams. However, the mobile nature of such devices requires compromises to be made with respect to the size and strength of their receiving equipment. The computational capabilities of such mobile electronic devices also remain limited in comparison with their mains-powered, fixed counterparts such as television sets or desktop computers. The handling of data delivery by broadcast can result in inefficient use of the limited resources of mobile electronic devices.

BRIEF DESCRIPTIONS OF THE DRAWINGS

Embodiments are described with reference to the following figures, in which.

DETAILED DESCRIPTION OF THE EMBODIMENTS

Figure 1:
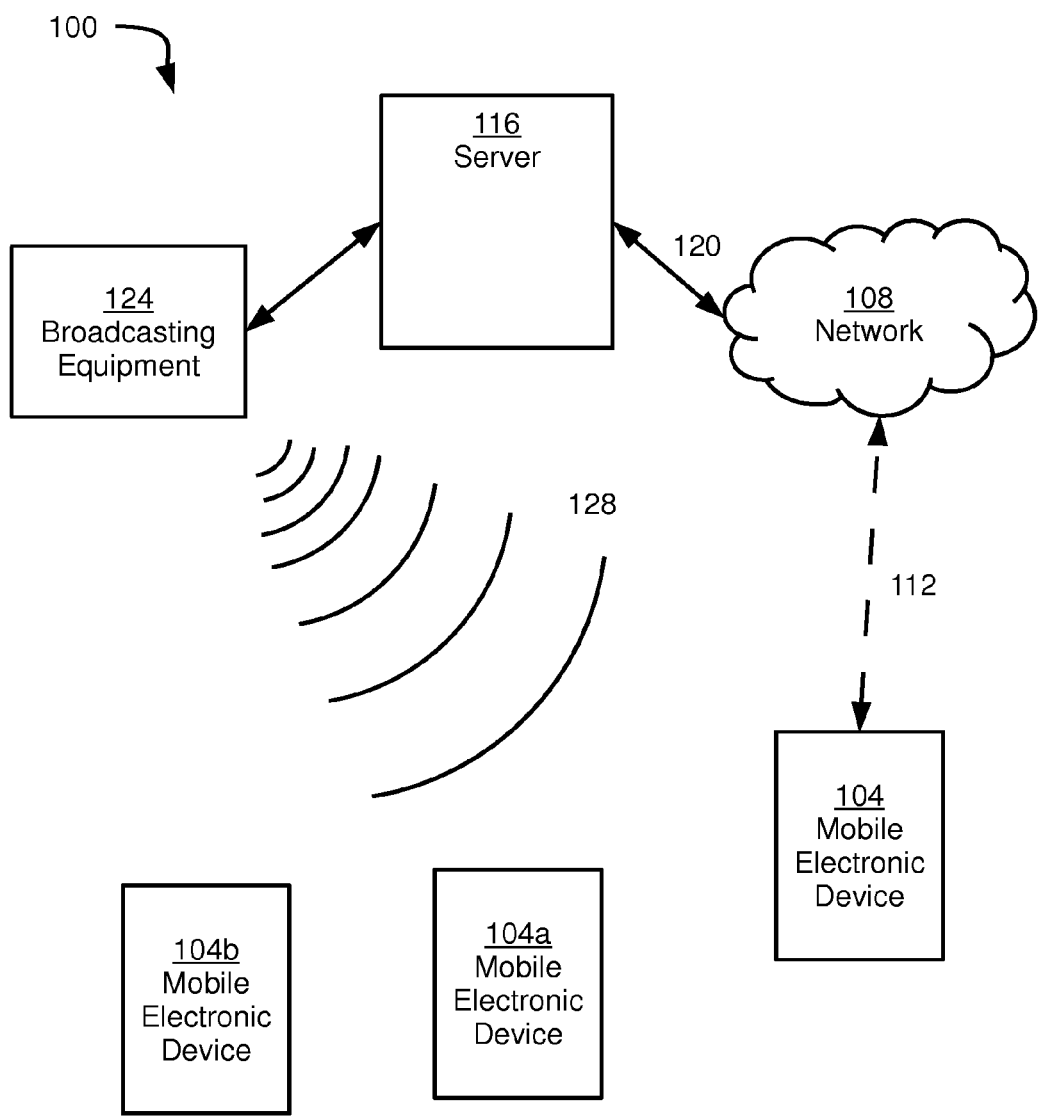
FIG. 1 depicts a system for delivering data to a mobile electronic device, according to a non-limiting embodiment.

According to an aspect of the specification, a method of delivering data to a mobile electronic device is provided, the method comprising: storing the NRT data in a memory of a server, the NRT data comprising a multimedia file; storing at least one network identifier in the memory, the at least one network identifier identifying at least a portion of the multimedia file and a storage location of the multimedia file; formatting the NRT data using a processor of the server, wherein the formatting comprises generating header data including the at least one network identifier, and appending the multimedia file to the header data; and providing the formatted NRT data to broadcast equipment for broadcasting.

According to another aspect of the specification, a non-transitory computer readable medium is provided for storing a plurality of computer-readable instructions executable by a processor, the instructions for implementing the above method.

According to yet another aspect of the specification, a server is provided, comprising: a memory for storing NRT data comprising a multimedia file, and for storing at least one network identifier in the memory, the at least one network identifier identifying at least a portion of the multimedia file and a storage location of the multimedia file; a network interface controller (NIC); and a processor interconnected with the memory and the NIC, the processor configured to format the NRT data, wherein the formatting comprises generating header data including the at least one network identifier, and appending the multimedia file to the header data; the processor further configured to provide the formatted NRT data to broadcast equipment for broadcasting.

As will be discussed below in greater detail, methods, systems and apparatuses are provided for delivering Non-Real-Time (NRT) data to mobile electronic devices, such as smart phone handsets. The methods, systems and apparatuses discussed herein are directed to three broad aspects relating to NRT data delivery: data segmentation, NRT schedule, and NRT Universal Resource Locators (URLs). The NRT schedule is a web-based repository where all NRT data that is planned for the next 24 hours (for example) can be found by the handset via the Internet. The handset can then download all the NRT data ahead of time, or the handset can download the NRT data later, or the handset can download only pieces of the NRT data that the handset did not receive as part of a public broadcast.

NRT URLs are another option such that each and every NRT element (also referred to herein as formatted NRT data such as a multimedia file that has been processed for broadcasting) is studded with URL information (e.g., in various locations in the NRT field) and with heavier than normal data protection (e.g., forward encryption) such that if the handset encounters severe signal fade while decoding the NRT data in broadcast mode, the handset may still decode the URL and can then fetch the data via the generally more reliable wireless Internet (e.g., making use of mobile phone networks). Data segmentation is such that any significant NRT file can be segmented along with its URL, mentioned above such that if a broadcast of one file segment is missed by the handset, the URL for that segment can be used to retrieve the segment via wireless Internet rather than the entire file.

The above aspects will now be discussed in greater detail with reference to the Figures. It is contemplated that various combinations of the above aspects can also be implemented, as will become apparent below.

FIG. 1 depicts a system 100 for delivering data to a mobile electronic device. System 100 includes a plurality of mobile electronic devices, such as mobile electronic devices 104, 104a, 104b. While mobile electronic device 104 alone will be discussed in detail below, it is contemplated that system 100 can include any number of mobile electronic devices, and that the below discussion of mobile electronic device 104 will inform the nature and operation of any further mobile electronic devices, including mobile electronic devices 104a and 104b, for example. Mobile electronic device 104, as will be described in further detail below, can be based on any suitable mobile computing environment. Thus, mobile electronic device 104 can be a cell phone, a smart phone, a tablet computer, a laptop computer, and the like. In the present example, mobile electronic device 104 is a smart phone (also referred to earlier herein as a handset).

Mobile electronic device 104 is connected with a network 108 via a link 112. It is contemplated that network 108 can include any suitable combination of wired and/or wireless networks, including but not limited to a Wide Area Network (WAN) such as the Internet, a Local Area Network (LAN), cell phone networks, WiFi networks, WiMax networks and the like. In the present embodiment, network 108 includes the Internet. Link 112 can be a wireless link based on any of Global System for Mobile communications (GSM), General Packet Radio Service (GPRS), Enhanced Data rates for GSM Evolution (EDGE), the third and fourth-generation mobile communication system (3G and 4G), Institute of Electrical and Electronic Engineers (IEEE) 802.11 (WiFi) or other wireless protocols. It will be understood that link 112 can also include any base stations and backhaul links necessary to connect mobile electronic device 104 to network 108.

System 100 also includes a server 116. Server 116, an example of which will be discussed in greater detail below, can be based on the computing environment of any known server architecture. Server 116 is connected with network 108 via a link 120. In the present example, link 120 is a wired link, although it is also contemplated that link 120 can also be a wireless link, or any suitable combination of wired and wireless links.

System 100 additionally includes broadcasting equipment 124 interconnected with server 116. It is contemplated that broadcasting equipment 124 can be co-located with server 116 (for example, in the same physical facility), and that the link between server 116 and broadcasting equipment 124 can thus lie outside network 108. In other examples (not shown), broadcasting equipment 124, or portions thereof, can be connected with server 116 via network 108. For example, multiple deployments of broadcasting equipment, generically referred to as broadcasting equipment 124, can exist in various physical locations, some connected to server 116 via network 108 and others connected to server 116 locally, outside network 108. Broadcasting equipment 124 can include any suitable combination of multiplexers, transmitters and the like for broadcasting data as a modulated radio frequency (RF) signal 128. The data which comprises broadcast signal 128 is stored in a non-transitory storage medium within broadcast equipment 124. Further, following receipt of signal 128 at mobile electronic device 104, the data which comprises broadcast signal 128 is stored in a non-transitory storage medium, as will be discussed in greater detail below.

As used herein, the term "broadcast" refers to "one-to-many" communications where the "one" is broadcasting equipment 124 and the "many" includes any device within range that is capable of receiving the broadcast. In other words, broadcast communications as discussed herein do not include individual devices when reached using unique destination addresses.

In general, server 116 is configured to control broadcasting equipment 124 to broadcast data to mobile electronic device 104 (though as noted above, broadcast 128 is not explicitly addressed to or directed at mobile electronic device 104 or any other device). Mobile electronic device 104 is configured to receive the broadcasted data, store the data as necessary, and consume the data. For example, mobile electronic device 104 can be configured to receive broadcast data representing a television show (e.g., encoded video data) and to display the received data, thus enabling the television show to be viewed on mobile electronic device 104.

Data suitable for broadcasting is not particularly limited, and can include, for example, multimedia such as television channels, movies, music and the like. Such broadcasting, in the present example embodiment, can be carried out under the Advanced Television Systems Committee Mobile/Handheld (ATSC-M/H) standard. It is contemplated, however, that any other suitable broadcasting standard can also be used. For example, the Advanced Television Systems Committee (ATSC) standard can be employed by server 116 and broadcasting equipment 124.

Under these standards, in order to prepare a file for broadcasting, server 116 is configured to add header data comprising one or more fields to the file. The fields of the header data define attributes of the file to be broadcast. For example, if the file is an episode of a television show, one field can include metadata for the file, comprising attributes such as the name of the television show, the title of the episode and the number of the episode. Server 116 can be configured to control broadcasting equipment 124 to broadcast multiple files simultaneously, for example in the form of multiple television channels (the files being multiplexed together prior to broadcasting). Thus, another field can be included in the header data for defining which channel the file belongs to. Once the header data has been added to the file, the file can be multiplexed with other prepared files as necessary and broadcast. Further discussion of the preparation, or formatting, of data for broadcasting will be provided below.

Figure 2:
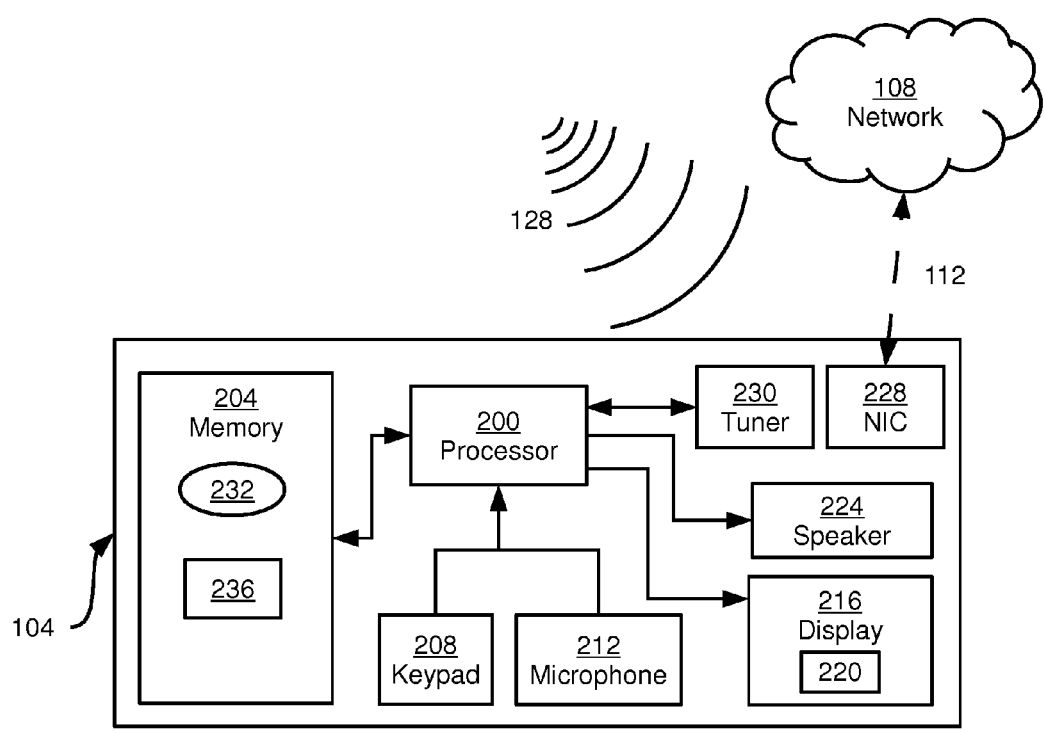
FIG. 2 depicts certain components of the mobile electronic device of FIG. 1, according to a non-limiting embodiment.

Turning to FIG. 2, a schematic representation of certain components of mobile electronic device 104 is shown. Mobile electronic device 104 includes a processor 200 interconnected with a non-transitory computer readable storage medium such as a memory 204. Memory 204 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Mobile electronic device 104 also includes one or more input devices interconnected with processor 200. Such input devices are configured to receive input and provide input data representative of the received input to processor 200. Input devices can include, for example, a keypad 208 and a microphone 212. It is contemplated that mobile electronic device 104 can include additional input devices in the form of one or more touch screens, touch pads, buttons, light sensors and the like (not shown). In general, it is contemplated that any suitable combination of the above-mentioned input devices can be incorporated into mobile electronic device 104.

Mobile electronic device 104 further includes one or more output devices. The output devices of mobile electronic device 104 include a display 216. Display 216 includes display circuitry 220 controllable by processor 200 for generating interfaces which include representations of data and/or applications maintained in memory 204. Display 216 includes a flat panel display comprising any one of, or suitable combination of, a Liquid Crystal Display (LCD), a plasma display, an Organic Light Emitting Diode (OLED) display, and the like. Circuitry 220 can thus include any suitable combination of display buffers, transistors, LCD cells, plasma cells, phosphors, Light Emitting Diodes (LEDs) and the like. In embodiments that include a touch screen input device, the touch screen can be integrated with display 216.

The output devices of mobile electronic device 104 can also include a speaker 224 interconnected with processor 200. Additional output devices can also be included, such as a light-emitting indicator (not shown) in the form of an LED, and the like.

Mobile electronic device 104 also includes a bi-directional communications interface such as network interface controller (NIC) 228 interconnected with processor 200. NIC 228 allows mobile electronic device 104 to communicate with other computing devices via link 112 and network 108. NIC 228 is interconnected with processor 200. It will now be understood that NIC 228 is selected for compatibility with link 112 as well as with network 108. NIC 228 is a bi-directional communications interface in that mobile electronic device 104 can, via NIC 228, both receive and transmit data. Mobile electronic device 104 also includes a uni-directional communications interface such as a tuner, or receiver, 230. Tuner 230 is interconnected with processor 200 and includes hardware, such as one or more antennae and associated circuitry, which enables mobile electronic device 104 to receive broadcasts 128 from broadcasting equipment 124. Tuner 230 is referred to as a unidirectional communications interface because it is contemplated that mobile electronic device 104 can receive data via tuner 230, but cannot transmit data using tuner 230.

Mobile electronic device 104 maintains, in memory 204, a broadcasting client application 232. Application 232 comprises a plurality of computer-readable instructions executable by processor 200. When executing the instructions of application 232, processor 200 is configured to carry out various functionality related to the processing of broadcast data, as will be discussed below.

Mobile electronic device 104 also includes a data store 236 in which received broadcast data, including both NRT data and real-time data, are maintained. It is contemplated that the storage of real-time data can be transient, in that such data can be written to data store 236 shortly before or simultaneously with its rendering on display 216 and removed from data store 236 shortly thereafter. In other embodiments, real-time data can be received shortly before or simultaneously with rendering, and maintained for a configurable time period after rendering (for example, application 232 may provide mobile electronic device 104 with the function to record received broadcasts or buffer broadcasts while viewing, to enable functionality such as replaying previously viewed content).

The various components of mobile electronic device 104 are interconnected, for example via a communication bus (not shown). Mobile electronic device 104 can be powered by a battery (not shown), though it will be understood that mobile electronic device 104 can also be supplied with electricity by a wired connection to a wall outlet or other power source, for example when docked.

Figure 3:
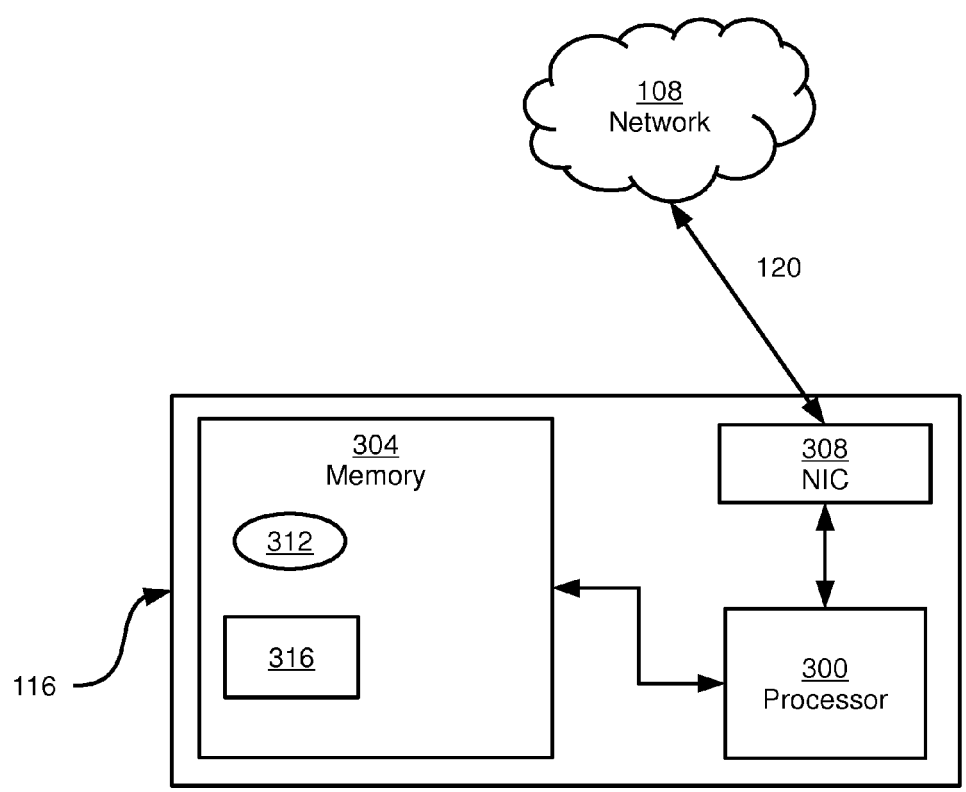
FIG. 3 depicts certain components of the server of FIG. 1, according to a non-limiting embodiment.

Turning now to FIG. 3, a schematic representation of certain components of server 116 is shown. Server 116 thus includes one or more processors such as a processor 300. Processor 300 is interconnected with a non-transitory computer-readable storage medium, such as a memory 304. Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Server 116 also includes one or more network interface controllers (NICs), such as NIC 308, for connecting server 116 with network 108 via link 120. In general, NIC 308 is selected for compatibility with link 120 and with network 108. NIC 308 is additionally selected to allow for communications with broadcast equipment 124, when broadcast equipment is co-located with server 116.

Server 116 can be managed by way of input and output devices (not shown) such as a keyboard, a mouse and a display. Such input and output devices can be co-located with server 116 and connected with processor 300 via local connections (e.g. Universal Serial Bus (USB)). In other embodiments, the input and output devices can be located at a terminal (not shown) remote from server 116 and connected to server 116 via network 108 and link 120. In some embodiments, both local input devices and a remote terminal can be present, and server 116 can be managed via either the local input devices or the remote terminal, as desired.

Server 116 maintains, in memory 304, a broadcasting server application 312. Application 312 also comprises a plurality of computer-readable instructions executable by processor 300. When executing the instructions of application 312, processor 300 is configured to carry out various functions related to the delivery of data to mobile electronic device 104. Server 116 also stores in memory 304 a data repository 316, in which data suitable for broadcasting is stored.

The data maintained in repository 316 can include both real-time and non-real-time (NRT) data. NRT data is data which is broadcast for use at a later time. That is, while a real-time broadcast of an episode of a television show is generally for immediate consumption and can therefore be displayed by mobile electronic device 104 substantially simultaneously with its receipt at mobile electronic device 104, the broadcast of NRT data enables server 116 to distribute content that will not necessarily be displayed by mobile electronic device 104 simultaneously with its broadcast and receipt. It is contemplated, however, that in some embodiments, real-time data can be saved for later consumption, and that NRT data can be displayed substantially simultaneously upon receipt.

A wide variety of data can be broadcast as NRT data, and is identified as such in broadcast 128 by the inclusion of an NRT field in the header data described earlier. The NRT field will be discussed in greater detail below, and can include data such as a flag indicating that the data is NRT data, or a future time at which the data is to be used, or both. NRT data can also be broadcast alongside "regular", real-time data, or during periods when less or no real-time data is being broadcast (thus leaving available bandwidth), or a combination of both. NRT data can also be consumed (for example, displayed at mobile electronic device 104) simultaneously with real-time data, or alone, or a combination thereof.

Figure 4:
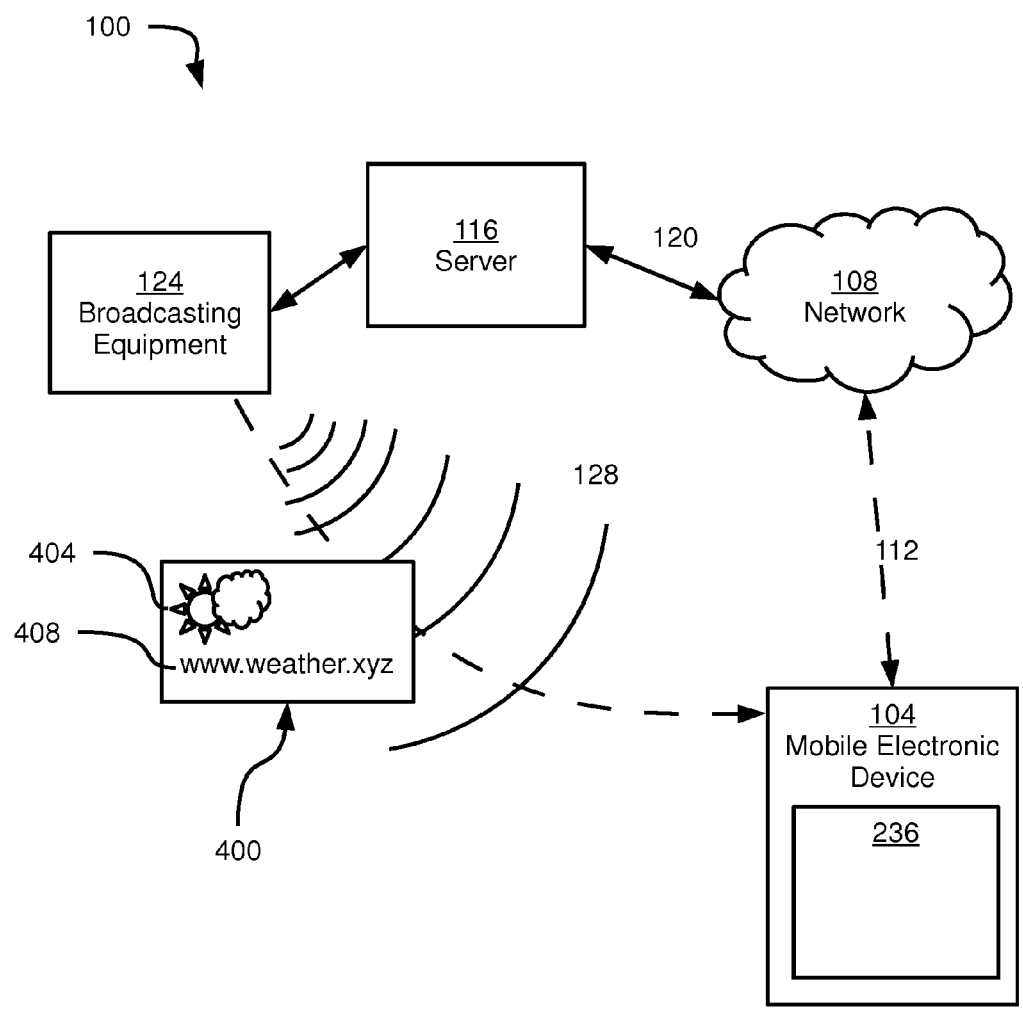
FIG. 4 depicts an example broadcast of data in the system of FIG. 1, according to a non-limiting embodiment.
Figure 5:
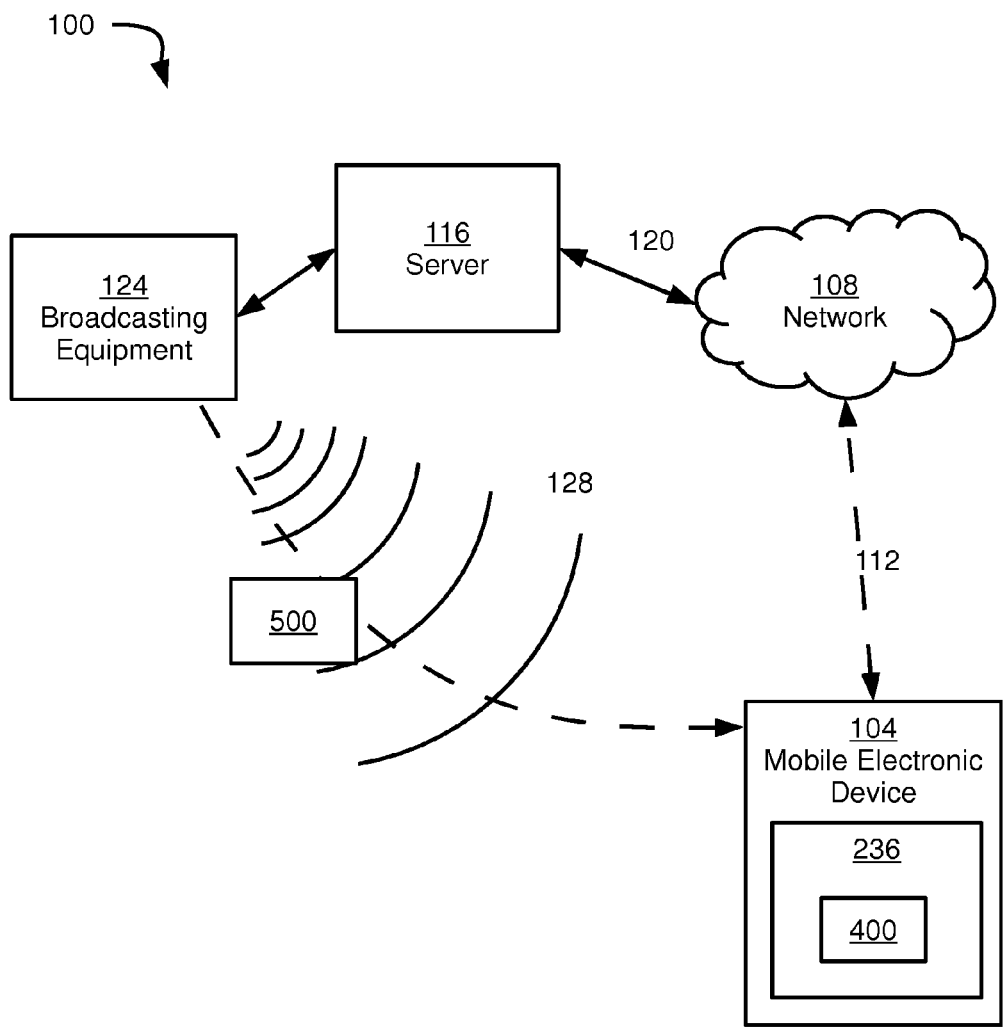
FIG. 5 depicts an example broadcast of further data in the system of FIG. 1, according to a non-limiting embodiment.
Figure 6:
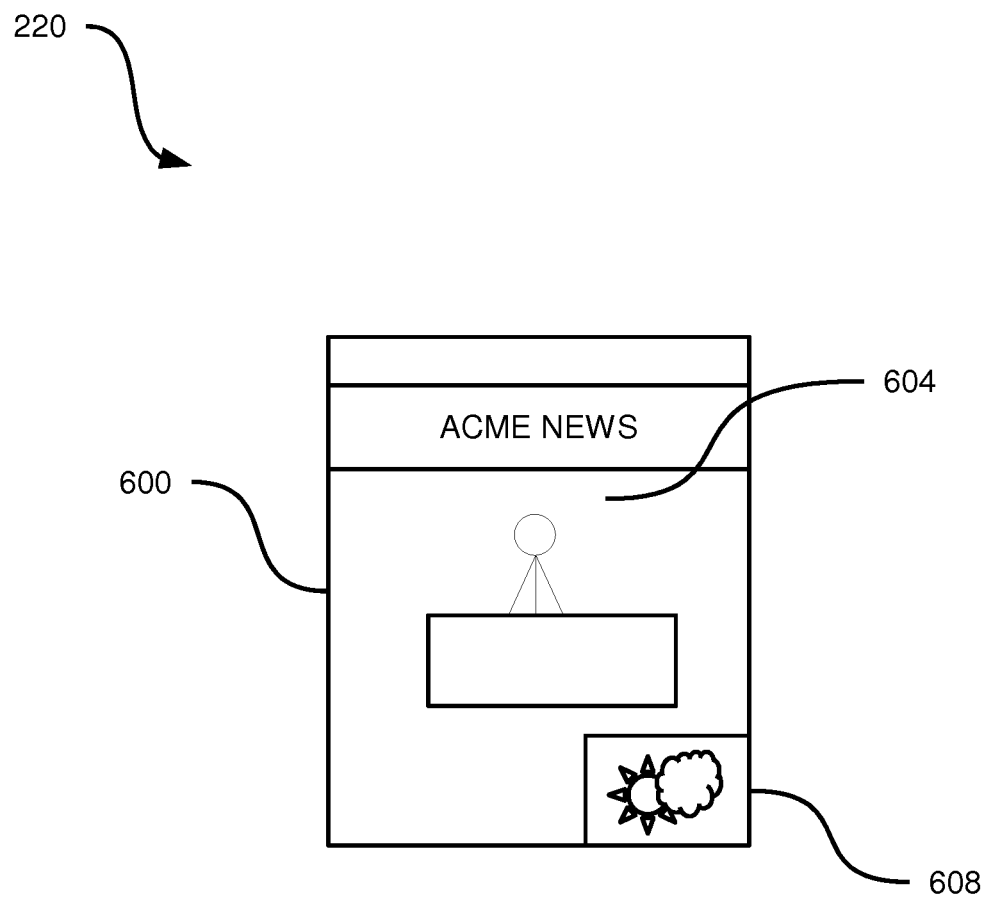
FIG. 6 depicts an example interface generated at the mobile electronic device of FIG. 1, according to a non-limiting embodiment.

Referring now to FIGS. 4 to 6, an example use of NRT data in conjunction with real-time data will be described. Turning to FIG. 4, an example delivery of NRT data comprising a multimedia file 400 is shown. In particular, file 400 is broadcast by broadcast equipment 124 under the control of server 116. File 400 includes an image 404 and a network identifier 408 (such as a Uniform Resource Locator (URL)). It is contemplated that file 400 as broadcast would also include header data (not shown) as discussed above. The header data can include, for example, an indication of a time and date, which comprises an instruction to mobile electronic device 104 as to when file 400 is to be consumed. It is contemplated that such an indication can also define a range of times and dates. The header data can include additional data, which will be discussed in connection with FIG. 7. It is contemplated that a wide variety of multimedia files are possible. For example, either or both of image 404 and URL 408 can be omitted and replaced with video data. File 400 is received at mobile electronic device 104 and stored in data store 236.

Turning to FIG. 5, at a later time, multimedia file 400 can be seen at mobile electronic device 104. Real-time data 500 is broadcast to mobile electronic device, for substantially simultaneous display on display 216. Real-time data 500 can be, for example, a video stream of a news program. FIG. 6 shows an example interface 600 generated in response to the receipt of real-time data 500 at mobile electronic device 104. In particular, interface 600 includes a representation 604 of real-time data 500 (which is updated as more real-time data 500 is received) and a representation 608 of multimedia file 400. Representation 608 includes image 404, and selection of representation 608 causes mobile electronic device 104 to transmit a request to a server (not shown) identified by URL 408. The request can cause the server to return weather data to mobile electronic device 104, for rendering on display 216 alongside the display of representation 604.

Other types of multimedia files are also contemplated. For example, file 400 can include instructions for causing mobile electronic device 104 to automatically request updated weather data at certain time intervals, without requiring a selection of representation 608.

Figure 7:
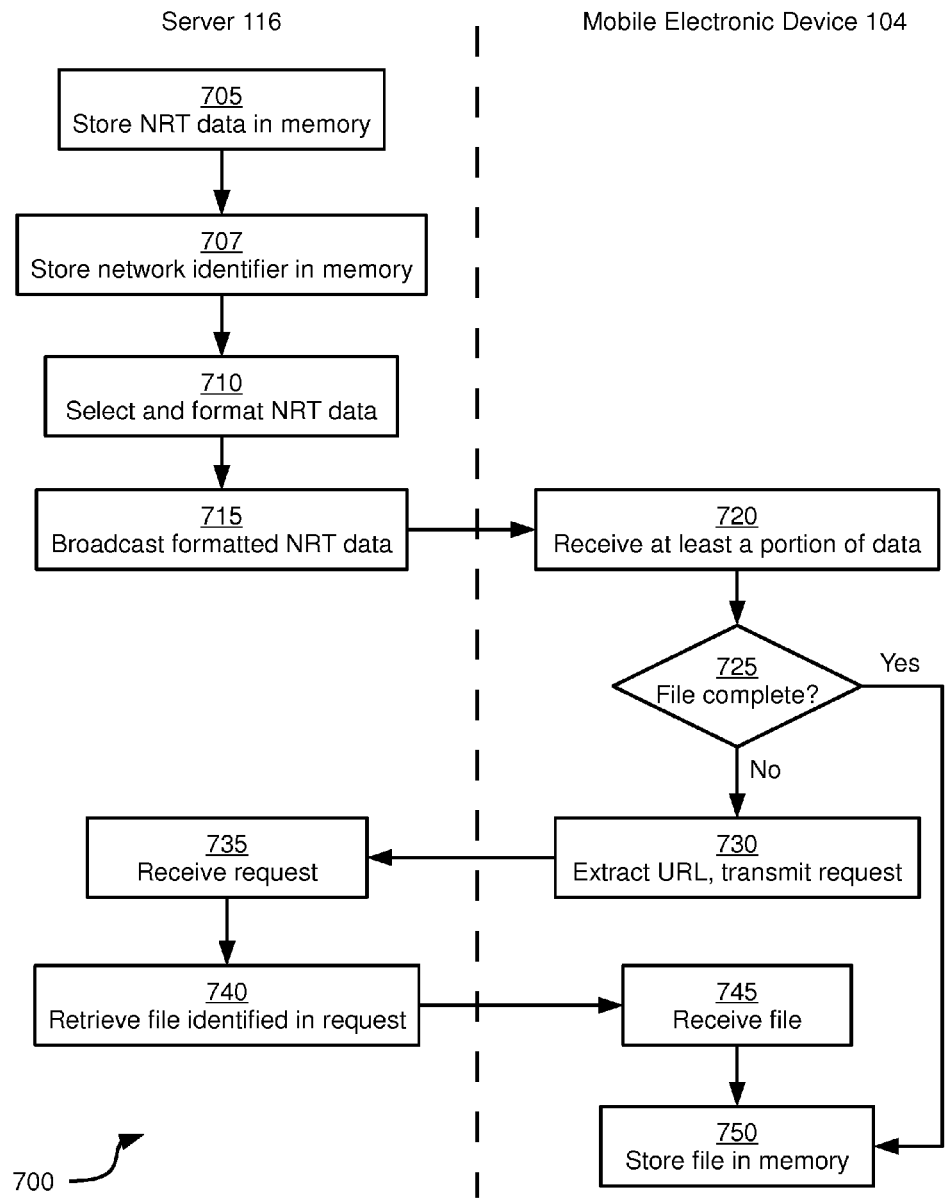
FIG. 7 depicts a method of delivering Non-Real-Time (NRT) data to a mobile electronic device, according to a non-limiting embodiment.

Turning now to FIG. 7, a method 700 of delivering NRT data, such as multimedia file 400, to a mobile electronic device is shown. The performance of method 700 will be discussed in connection with its performance on system 100, though it will be appreciated that method 700, and variations thereof, can also be performed on other suitable systems. The blocks of method 700 are indicated as being performed at either server 116 or mobile electronic device 104. It is contemplated that those blocks performed at server 116 are performed by processor 300, as configured via execution of application 312. It is further contemplated that those blocks performed at mobile electronic device 104 are performed by processor 200, as configured via execution of application 232.

Beginning at block 705, processor 300 is configured to store NRT data comprising multimedia file 400, in memory 304 (more specifically, in repository 316). It is contemplated that in some examples, the NRT data can comprise a plurality of multimedia files. Additional data can be maintained in repository 316 in association with multimedia file 400. For example, for file 400 (and for each other multimedia file stored in repository 316 when NRT data comprises multiple multimedia files), a time and date of broadcasting can also be stored, indicating when the file is to be broadcast. Additionally, a time and date of use or consumption can be stored in memory 304, indicating when multimedia file 400 is to be used, for example by displaying multimedia file 400 at mobile electronic device 104.

At block 707, server 116 is configured to store at least one network identifier in memory 304 in association with multimedia file 400. Identifying at least a portion of the multimedia file and a storage location of the multimedia file; The network identifier can include, for example, a URL, an IP address, or a MAC address. In the present example, the network identifier is a URL. The at least one URL, and more generally, any network identifier stored in memory 304, identifies at least a portion of multimedia file 400, and also identifies the storage location of file 400 (e.g.,. repository 316 of server 116, though other storage locations can also be used) on network 108. Thus, an example URL stored at block 707 for file 400 is, "www.server116.com/400", where the string "www.server116.com" identifies repository 316 on network 108, and the string "400" identifies file 400 within repository 316 on network 108.

Proceeding to block 710, processor 300 is configured to select multimedia file 400 for broadcasting and to format file 400. It is contemplated that file 400 can be selected based on the time and date of broadcasting stored in association with file 400 in repository 316. It is also contemplated that a plurality of multimedia files defining the NRT data may have the same indicated times and dates of broadcasting, and that block 710 (and indeed, any portion of method 700, including the entirety of method 700) can therefore be performed repeatedly for each of the multimedia files to be broadcast.

Having selected file 400 for broadcasting, processor 300 is configured to format file 400 at block 710. Formatting file 400 for broadcasting includes generating header data and appending multimedia file 400 to the header data. Header data is generated by processor 300 based on the above-mentioned data stored in memory 304 in association with multimedia file 400. In the present example, header data includes the above-mentioned network identifier, and can also include the time and date of use mentioned above.

Figure 8:
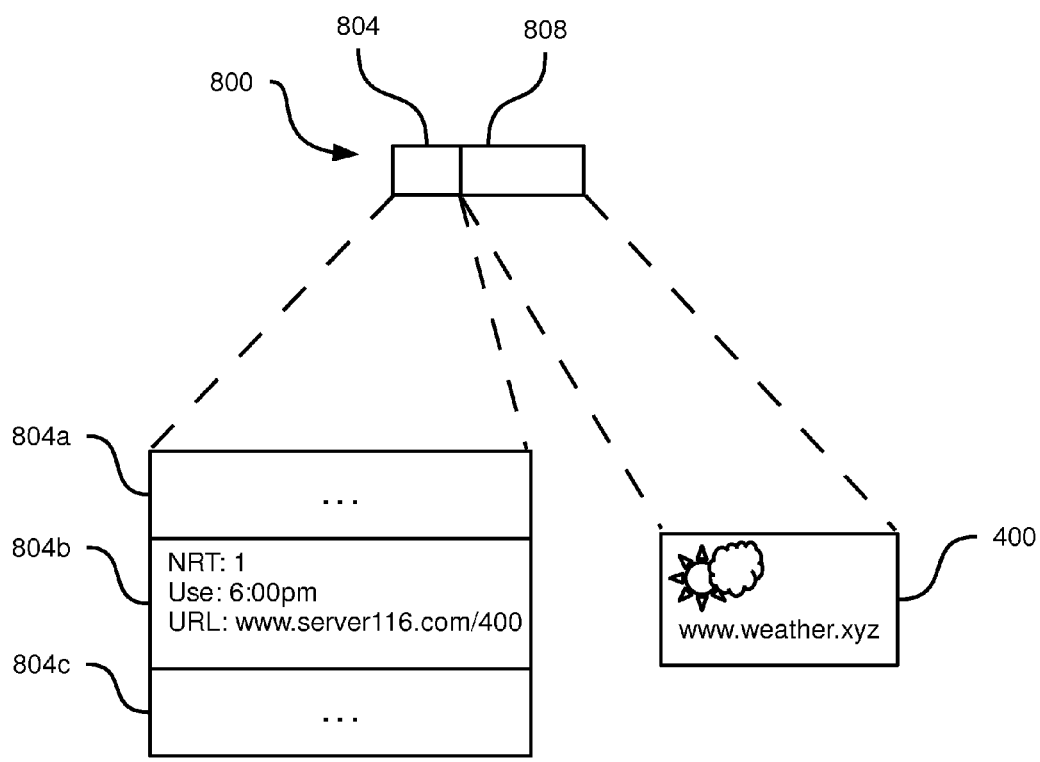
FIG. 8 depicts an exemplary performance of block 710 of the method of FIG. 7, according to a non-limiting embodiment.

Turning to FIG. 8, a schematic depiction of formatted NRT data 800, an example of the output of block 710, is shown. Formatted NRT data 800 includes header data 804 and payload data, or content, 808. Header data 804, as seen in FIG. 8, includes fields 804a, 804b, 804c and the like. In particular, field 804b, also referred to as an "NRT field", contains attributes including a flag—shown as a binary value in FIG. 8—which indicates whether or not the payload is NRT data. The attributes also include the URL, or other network identifier, discussed above. The attributes can also include the time and date of use mentioned above (date not shown in FIG. 8). In some embodiments, a plurality of attributes comprising the URL can be included.

Additional fields can be included in header data 804. For example, fields 804a and 804b can include attributes which define channel characteristics or any other information relevant to a broadcast in ATSC-MH. The format and contents of fields 804a, 804b, 804c can be varied as necessary for implementation in other standards, such as ATSC. The fields of header data 804, and the attributes included within each field, can be delimited by tags or other recognizable formatting data.

The content portion 808 of formatted NRT data 800 includes multimedia file 400, as described earlier. Thus, formatted NRT data comprises header data 804 with multimedia file 400 appended thereto. Thus, in general terms, the performance of block 710 involves generating formatted NRT data 800 with at least one network identifier embedded therein.

The performance of method 700 continues at block 715, at which processor 300 is configured to broadcast the formatted NRT data 800 resulting from the performance of block 710. Broadcasting formatted NRT data 800 comprises providing data 800 to broadcasting equipment 124 and/or controlling broadcasting equipment 124 to broadcast formatted NRT data 800 in a one-to-many manner, for example, using the ATSC-M/H standard as discussed above.

At block 720, processor 200 of mobile electronic device 104 is configured to receive at least a portion of formatted NRT data 800 via tuner 230 and store the received data in memory 204 (in particular, in data store 236). At block 725, processor 200 is configured to determine if the data received at block 720 is complete (that is, if the entirety of formatted NRT data 800 was received from broadcasting equipment 124). The determination at block 725 can be based on, for example, start and end tags contained with formatted NRT data 800. That is, if processor 200 detects a start tag at the beginning of header data 804 but no end tag at the end of content 808 (i.e. multimedia file 400), processor 200 can determine that the entirety of formatted NRT data 800 was not received. In another example embodiment, formatted NRT data 800 can include an indication of the total size of formatted NRT data 800. Thus, if the total size of the data received at block 720 does not match that indication, the determination at block 725 is negative.

It will now be apparent that the data received at block 720 can be incomplete for a variety of reasons. For example, mobile electronic device 104 can be in motion during the broadcast of formatted NRT data 800, and thus can be physically obstructed (by a bridge, tunnel, building and the like) from receiving a portion of formatted NRT data 800.

Following a negative determination at block 725 (e.g., meaning that the data received at block 720 was not the complete formatted NRT data 800), performance of method 700 proceeds to block 730, at which processor 200 is configured to extract the at least one URL from the data received at block 720. Thus, processor 200 can be configured to recognize header data 804, as well as any tags used to delimit the one or more URL attributes within field 804*b* as described above. Having extracted the URL from the received data, processor 200 is configured to transmit a request to server 116, via NIC 228 and network 108. Thus, while the data received at block 720 was broadcast in a first standard such as ATSC-M/H, the request transmitted at block 730 is made based on a second standard. That is, as used herein the term "transmit" refers to a different type of communication than the term "broadcast". In particular, the term "transmit" refers to an explicitly addressed communication. The second standard can be a wireless communications standard such as Global System for Mobile Communications (GSM) or CDMA2000. Other suitable standards will now occur to those skilled in the art. The request can be, for example, a Hypertext Transfer Protocol (HTTP) request. The request includes the URL (or other network identifier) extracted from the data received at block 720, and thus identifies server 116 and multimedia file 400. It is also contemplated that when field 804*b* of header data 800 includes more than one URL attribute, processor 200 can be configured to extract each URL attribute and to select the longest extracted URL, on the assumption that shorter URLs may have been incompletely received.

At block 735, processor 300 of server 116 receives the request via NIC 308. Processor 300 retrieves multimedia file 400, which is identified by the request, at block 740 and transmits the retrieved file 400 to mobile electronic device 104 via network 108, in a message based on the above-mentioned second standard (e.g. GSM).

At block 745, processor 200 is configured to receive multimedia file 400 from server 116 via NIC 228. Proceeding to block 750, processor 200 is configured to store multimedia file 400 in data store 236 for later use (for example, in generating interface 600, discussed earlier). It should be noted that when the determination at block 725 is affirmative (that is, when processor 200 determines that the complete formatted NRT data 800 was received at block 720), the performance of method 700 proceeds directly to block 750, at which multimedia file 400 can be extracted from formatted NRT data 800 and stored in data store 236.

Figure 9:
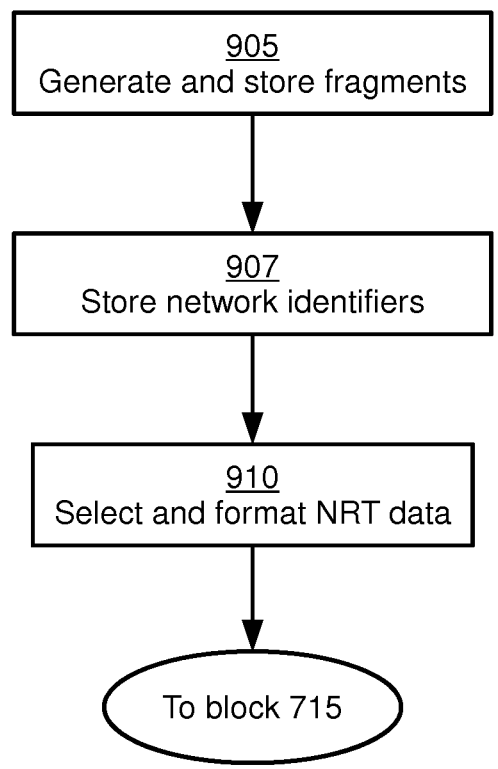
FIG. 9 depicts a method of delivering Non-Real-Time (NRT) data to a mobile electronic device, according to another non-limiting embodiment.

Numerous variations to method 700 are contemplated. For example, in some embodiments, as mentioned earlier in connection with the "data segmentation" aspect, in addition to the generation of header data comprising network identifiers, server 116 can be configured to generate a plurality of segments from multimedia file. Turning to FIG. 9, a method 900 of delivering NRT data according to the data segmentation aspect is shown. Beginning at block 905, processor 300 is configured to store NRT data, as described above in connection with block 705. At block 905, however, processor 300 is also configured to generate a plurality of segments from multimedia file 400, the sum of the segments representing the entirety of file 400. Each segment is stored in repository 316. The generation of segments is not particularly limited. For example, in some embodiments, processor 300 can be configured to generate segments that are substantially equal in size. In other embodiments, processor 300 can be configured to generate segments based on the contents of file 400. For example, a segment can be generated containing image 404, while a second segment can be generated containing network identifier 408. More generally, processor 300 can be configured to generate segments based on any suitable combination of criteria, including but not limited to segment size and data type.

At block 907, processor 300 is configured to store a plurality of network identifiers. As discussed above, each network identifier identifies repository 316 at server 116 (or any other suitable storage location for multimedia file 400) as well as multimedia file 400. In addition, each network identifier identifies the particular segment with which it is associated. Thus, for example, a URL for the first segment of file 400 can be, "www.server116.com/NRT400/seg1".

It will now be understood that processor 300 can also be configured to store additional data, such as time and dates of broadcasting and use, in association with either multimedia file as a whole or in association with each segment. Continuing at block 910, processor 300 can be configured to select the NRT data for delivery substantially as discussed above. Also at block 910, processor 300 is configured to format the NRT data by generating a plurality of headers 800. One header 800 can be generated for each segment generated at block 905, and each header can thus include the network identifier corresponding to the relevant segment.

It is contemplated that in some embodiments, the generation of segments can be performed at block 910 rather than block 905. That is, the performance of block 905 can comprise storing multimedia file 400 in its original form, and the performance of block 910 can comprise the generation and storage of segments.

Figure 10:
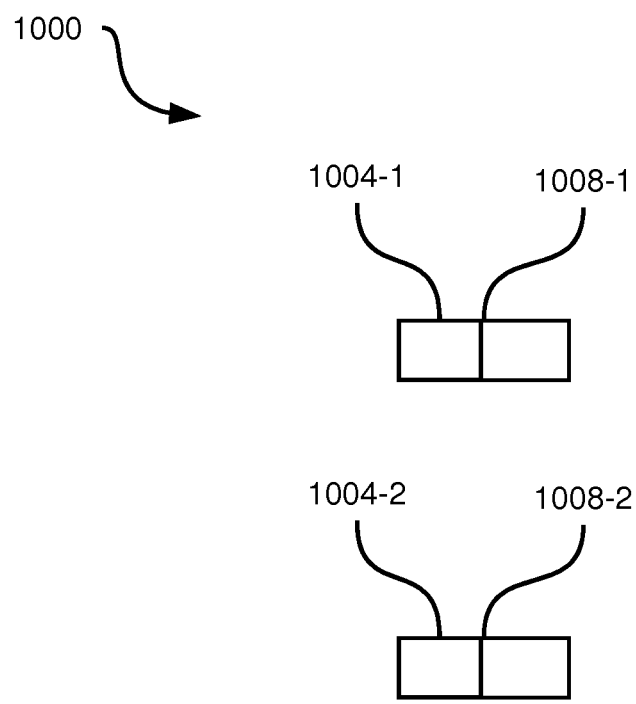
FIG. 10 depicts an exemplary performance of block 910 of the method of FIG. 9, according to a non-limiting embodiment.

Turning to FIG. 10, an example output of block 910 is shown, in which formatted NRT data 1000 includes a plurality of segments, each including header data 1004 and content 1008 (comprising a segment of file 400) appended to header data 1004. The totality of content portions 1008-1 and 1008-2 thus represent multimedia file 400.

Following the performance of block 910, the remainder of method 900 is as described above in connection with method 700. Thus, returning to FIG. 7, formatted NRT data 1000 comprising the segments is broadcast, and processor 200 of mobile electronic device 104 is configured, at block 725, to determine if each segment is complete, and if all segments have been received. Various methods are contemplated for performing this determination. For example, each broadcasted file segment (or only some file segments, in other embodiments) can include data identifying all segments, the total number of segments, the order of segments, and the like. Processor 200 can therefore be configured to determine, after a configurable time period has elapsed or after the final segment has been received, whether each file segment has been received completely.

When processor 200 determines, at block 725, that one or more file segments were not received completely at block 720, processor 200 may extract network identifiers (e.g. URLs) from any incomplete segments, and to transmit a request for each incomplete segment. In other embodiments, processor 200 may extract the network identifiers, and to transmit a single request for all incomplete file segments.

In a further variation, processor 200 of mobile electronic device 104 may transmit a request at block 730 comprising an identifier of each multimedia file or file segment which was successfully received at block 720. That is, rather than requesting missing files or file segments, processor 200 can transmit a request that informs server 116 of which files or file segments are already present at mobile electronic device 104. Thus, processor 300 of server 116 may, at block 740, to determine which files or file segments have not yet been received at mobile electronic device 104 by determining which file identifiers or segment identifiers are not contained within the request received at block 735.

Figure 11:
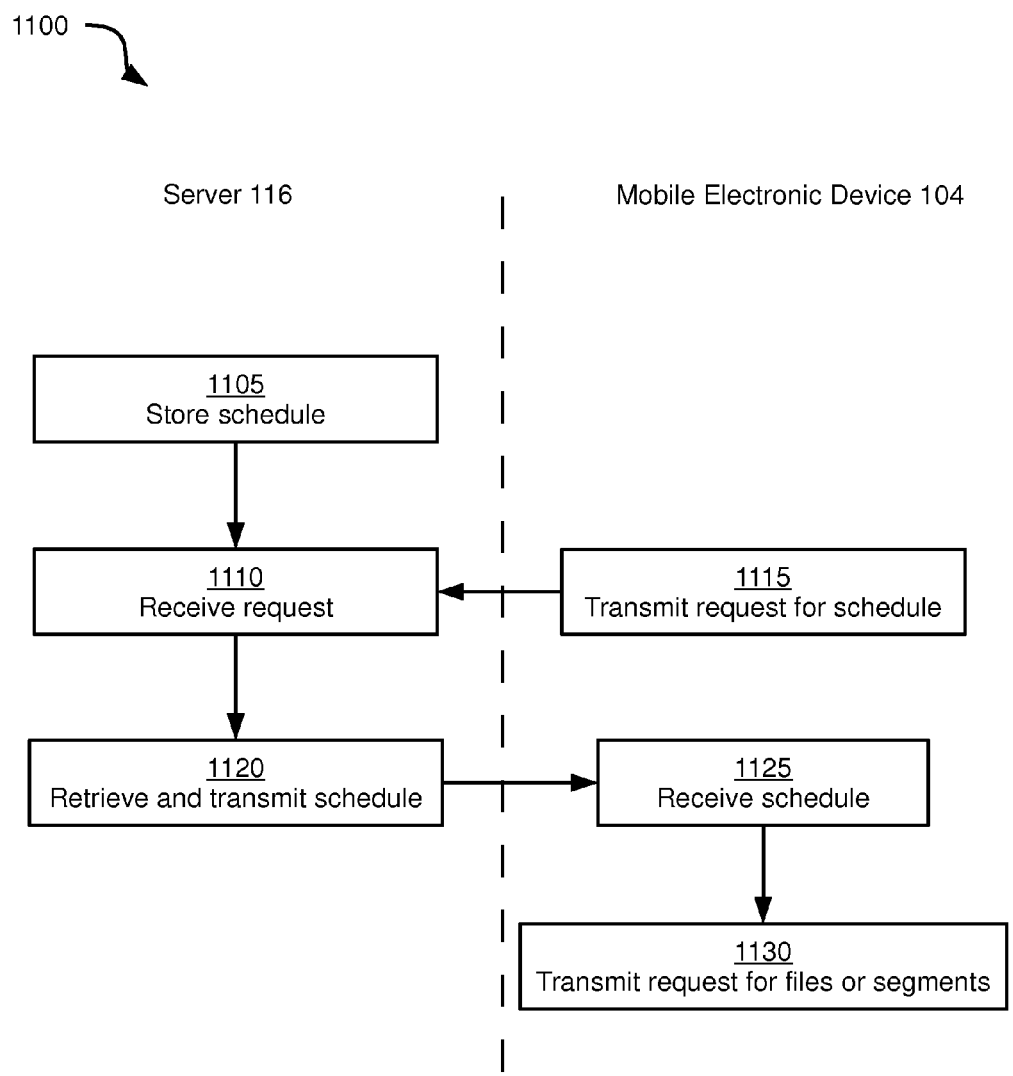
FIG. 11 depicts a method of delivering Non-Real-Time (NRT) data to a mobile electronic device, according to an additional non-limiting embodiment.

Still further variations are contemplated, as mentioned earlier in connection with the "NRT schedule" aspect. Turning to FIG. 11, a method of delivering NRT data is shown according to an additional non-limiting embodiment. At block 1105, server 116 can be configured to maintain a schedule, or list, of NRT data scheduled to be broadcast within a configurable predetermined time period. For example, processor 300 may generate and update a list of all multimedia files (such as multimedia file 400) with time and dates of use that occur within the next twenty-four hours. The period of twenty-four hours is provided solely as an example and a variety of other time periods can also be used, including but not limited to one hour and one week.

Having stored the schedule, server 116 may, at block 1110, receive a request from mobile electronic device 104, transmitted at block 1115 via a wireless communications standard such as GSM, for the schedule. In response to the request, server 116 can transmit the schedule, at block 1120, to mobile electronic device 104. The schedule can include the network identifiers (e.g. URLs) mentioned above for any multimedia files or file segments identified by the schedule. Thus, having received the schedule containing the network identifiers at block 1125, mobile electronic device 104 can request the associated files or file segments from server 116 at block 1130, which can then be configured to transmit such files or file segments, as described above in connection with blocks 740, 745 and 750 of method 700.

It is contemplated that mobile electronic device 104 can be configured to request the schedule either independently from, or dependent on, the performance of methods 700 and 900. For example, in some embodiments, a request similar to the request transmitted at block 730 can be transmitted by mobile electronic device 104 without having received any broadcasted data. That is, such a request can be transmitted, for example at configurable intervals, independently of the performance of method 700 or method 900. Thus, a request can be transmitted to server 116 via network 108 based on the above-mentioned second standard, causing server 116 to return all NRT data which are to be consumed (i.e. used) in the twenty-four hour period following the request. In some embodiments, the request from mobile electronic device 104 can include identifiers of any files or file segments received during earlier broadcasts or as a result of earlier such requests. Server 116 can then be configured to transmit only those multimedia files or segments which mobile electronic device 104 "needs" (that is, for which identifiers were not included in the request).

In other embodiments, mobile electronic device 104 can be configured to transmit a request for the schedule dependent on the results of the performance of method 700 or 900. For example, following a negative determination at block 725, processor 200 of mobile electronic device 104 may transmit a request for the schedule to server 116 rather than, or in addition to, the request transmitted at block 730. For example, mobile electronic device 104 may transmit a request for the schedule when some data was received at block 720, but the received data was insufficient to successfully extract a URL.

Mobile electronic device 104 can obtain an identifier, such as a URL, for the schedule in a variety of ways. For example, mobile electronic device 104 can be preloaded with a URL identifying the Internet address of the schedule on server 116 (for example, by receipt of input data at keypad 208). In other embodiments, the URL for the schedule can be included in formatted NRT data 800 or 1000 as broadcast.

Those skilled in the art will appreciate that in some embodiments, the functionality of applications 232 and 312 can be implemented using pre-programmed hardware or firmware elements (e.g., application specific integrated circuits (ASICs), electrically erasable programmable read-only memories (EEPROMs), etc.), or other related components.

Other aspects of the specification will also now be apparent. For example, according to a further aspect, a method is provided comprising receiving, via a tuner of a mobile electronic device, broadcast data comprising at least a portion of formatted NRT data comprising a multimedia file; determining, using a processor of the mobile electronic device, if the formatted NRT data is complete; when the determination is negative, extracting a network identifier identifying at least a portion of the multimedia file and a storage location of the multimedia file from the formatted NRT data and transmitting, via a NIC of the mobile electronic device, a request containing the network identifier to a server.

The method can further comprise receiving, in response to the request, at least a portion of the multimedia file, and storing the at least a portion of the multimedia file in a memory of the mobile electronic device.

The broadcast can be based on a first standard, and the request and the response can be based on a second standard.

The first standard can be one of the Advanced Television Systems Committee—Mobile/Handheld (ATSC-M/H) standard and the Advanced Television Systems Committee (ATSC) standard, and the second standard can be a wireless communications standard.

The method can further comprise transmitting a request for a schedule, the schedule comprising at least one network identifier.

The method can further comprise receiving the schedule in response to the request, via the NIC; and transmitting a request comprising one or more of the at least one network identifier included in the schedule.

The request can include at least one identifier identifying a file or file segment stored in the memory.

According to a further aspect, a mobile electronic device is provided configured to perform the above method.

According to a still further aspect, a non-transitory computer-readable medium is provided, comprising computer-readable instruction executable by a processor of a mobile electronic device for carrying out the above method.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method of delivering Non-Real-Time (NRT) data to a mobile electronic device for later playback of the NRT data at the mobile electronic device, the method comprising:

storing the NRT data in a memory of a server, the NRT data comprising a multimedia file;

storing at least one uniform resource locator (URL) in the memory, the at least one URL including a name of at least a portion of the multimedia file, the URL further including a network address of a storage location at the server containing the multimedia file, the storage location comprising a network accessible repository maintained in the memory and being accessible to the mobile electronic device via a network;

retrieving the multimedia file from the memory, and generating formatted NRT data using a processor of the server, by;
   generating header data including the at least one URL and omitting any mobile electronic device identifiers, and responsive to generating the header data, appending the multimedia file to the header data to produce the formatted NRT data;
providing the formatted NRT data to broadcast equipment for broadcasting using a first standard; responsive to the broadcasting: receiving, at the server from a specific mobile electronic device, a request for at least a portion of the multimedia file, the request based on a second standard; and retrieving and transmitting the requested portion of the multimedia file from the network accessible repository to the specific mobile electronic device, using the second standard.

2. The method of claim 1, wherein the first standard is one of the Advanced Television Systems Committee (ATSC) standard and the Advanced Television Systems Committee-Mobile/Handheld (ATSC-M/H) standard, and wherein the second standard is a wireless communications standard.

3. The method of claim 1, wherein storing the NRT data comprises generating a plurality of file segments using the processor, each segment containing a portion of the multimedia file, and storing each file segment in the memory;
   wherein storing the at least one string comprises storing a plurality of strings, each string including a name of one of the file segments and the network address of the storage location at the server; and
   wherein generating the formatted NRT data comprises, for each one of the plurality of file segments, generating header data including the string corresponding to the one of the plurality of file segments.

4. The method of claim 1, wherein the network address of the storage location is a Uniform Resource Locator (URL).

5. The method of claim 1, further comprising:
   storing a NRT schedule in the memory, the NRT schedule comprising the at least one string;
   receiving a request for a NRT schedule at the NIC; and
   transmitting the schedule in response to the request via the NIC.

6. A server, comprising:
   a memory for storing Non-Real Time (NRT) data comprising a multimedia file for delivery and later playback at a mobile electronic device, and for storing at least one uniform resource locator (URL), the at least one URL including a name of at least a portion of the multimedia file, the URL further including a network address of a storage location at the server containing the multimedia file, the storage location comprising a network accessible repository maintained in the memory and being accessible to the mobile electronic device via a network;
   a network interface controller (NIC); and
   a processor interconnected with the memory and the NIC, the processor configured to retrieve the multimedia file from the memory, and generated formatted NRT data, by:
      generating header data including the at least one URL and omitting any mobile electronic device identifiers, and
      responsive to generating the header data, appending the multimedia file to the header data to produce the formatted NRT data;
   the processor further configured, responsive to the appending, to provide the formatted NRT data to broadcasting equipment for broadcasting using a first standard; the processor further configured, responsive to the broadcasting, to: receive a request from a specific mobile electronic device for at least a portion of the multimedia file, the request based on a second standard; and retrieve and transmit the requested portion of the multimedia file from the network accessible repository to the specific mobile electronic device, using the second standard.

7. The server of claim 6, wherein the first standard is one of the Advanced Television Systems Committee (ATSC) standard and the Advanced Television Systems Committee-Mobile/Handheld (ATSC-M/H) standard, and wherein the second standard is a wireless communications standard.

8. The server of claim 6, the processor being configured to store the NRT data in the memory by generating a plurality of file segments, each segment containing a portion of the multimedia file;
   the processor being configured to store the at least one string in the memory by storing a plurality of strings, each string including a name of one of the file segments and the network address of the storage location at the server; and
   the processor being configured to generated the formatted NRT data by, for each one of the plurality of file segments, generating header data including the string corresponding to the one of the plurality of file segments.

9. The server of claim 6, wherein the network address of the storage location is a Uniform Resource Locator (URL).

10. A non-transitory computer readable medium for storing a plurality of computer-readable instructions executable by a processor, the instructions for implementing a method of delivering Non-Real-Time (NRT) data to a mobile electronic device for later playback of the NRT data at the mobile electronic device, the method comprising:
   storing the NRT data in a memory of a server, the NRT data comprising a multimedia file;
   storing at least one uniform resource locator (URL) in the memory, the at least one URL including a name of at least a portion of the multimedia file, the URL further including a network address of a storage at the server containing the multimedia file, the storage location comprising a network accessible repository maintained in the memory and being being accessible to the mobile electronic device via a network;
   retrieving the multimedia file from the memory, and generating formatted NRT data using the processor of the server, by:
      generating header data including the at least one URL and omitting any mobile electronic device identifiers, and
      responsive to generating the header data, appending the multimedia file to the header data to produce the formatted NRT data;
   responsive to the appending, providing the formatted NRT data to broadcasting equipment for broadcasting using a first standard; responsive to the broadcasting: receiving, at the server from a specific mobile electronic device, a request for at least a portion of the multimedia file, the request based on a second standard; and retrieving and transmitting the requested portion of the multimedia file from the network accessible repository to the specific mobile electronic device, using the second standard.

11. The non-transitory computer readable medium of claim 10, wherein the first standard is one of the Advanced Television Systems Committee (ATSC) standard and the Advanced Television Systems Committee - Mobile/Handheld (ATSC-M/H) standard, and wherein the second standard is a wireless communications standard.

12. The non-transitory computer readable medium of claim 10, wherein storing the NRT data comprises generating a plurality of file segments at the processor, each segment containing a portion of the multimedia file, and storing each file segment in the memory;
   wherein storing the at least one string comprises storing a plurality of strings, each string including a name of one of the file segments and the network address of the storage location at the server; and
   wherein generating the formatted NRT data comprises, for each one of the plurality of file segments, generating header data including the string corresponding to the one of the plurality of file segments.

13. The non-transitory computer readable medium of claim 10, wherein the network address of the storage location is a Uniform Resource Locator (URL).

14. The non-transitory computer readable medium of claim 10, wherein the method further comprises:
   storing a NRT schedule in the memory, the NRT schedule comprising the at least one string;
   receiving a request for a NRT schedule at the NIC; and
   transmitting the schedule in response to the request via the NIC.

* * * * *